United States Patent Office.

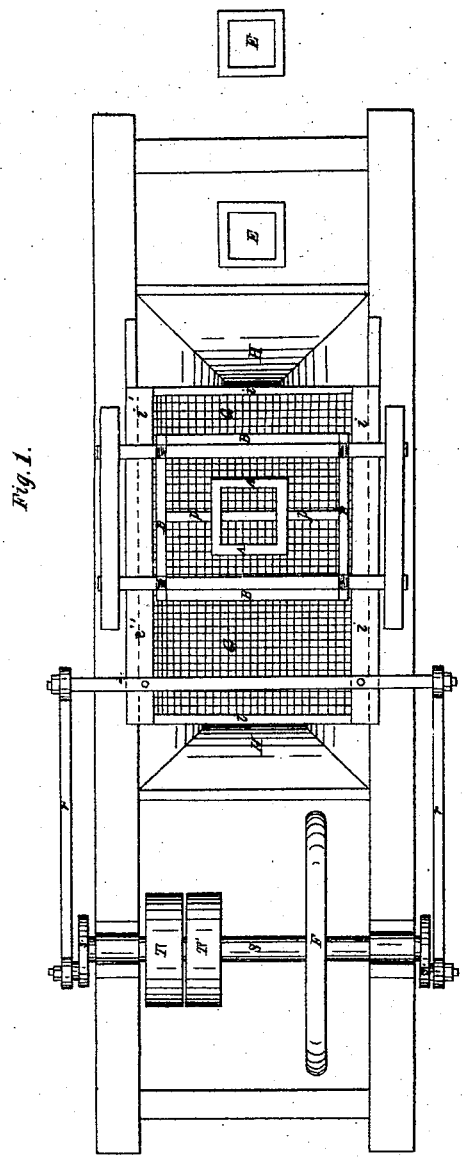

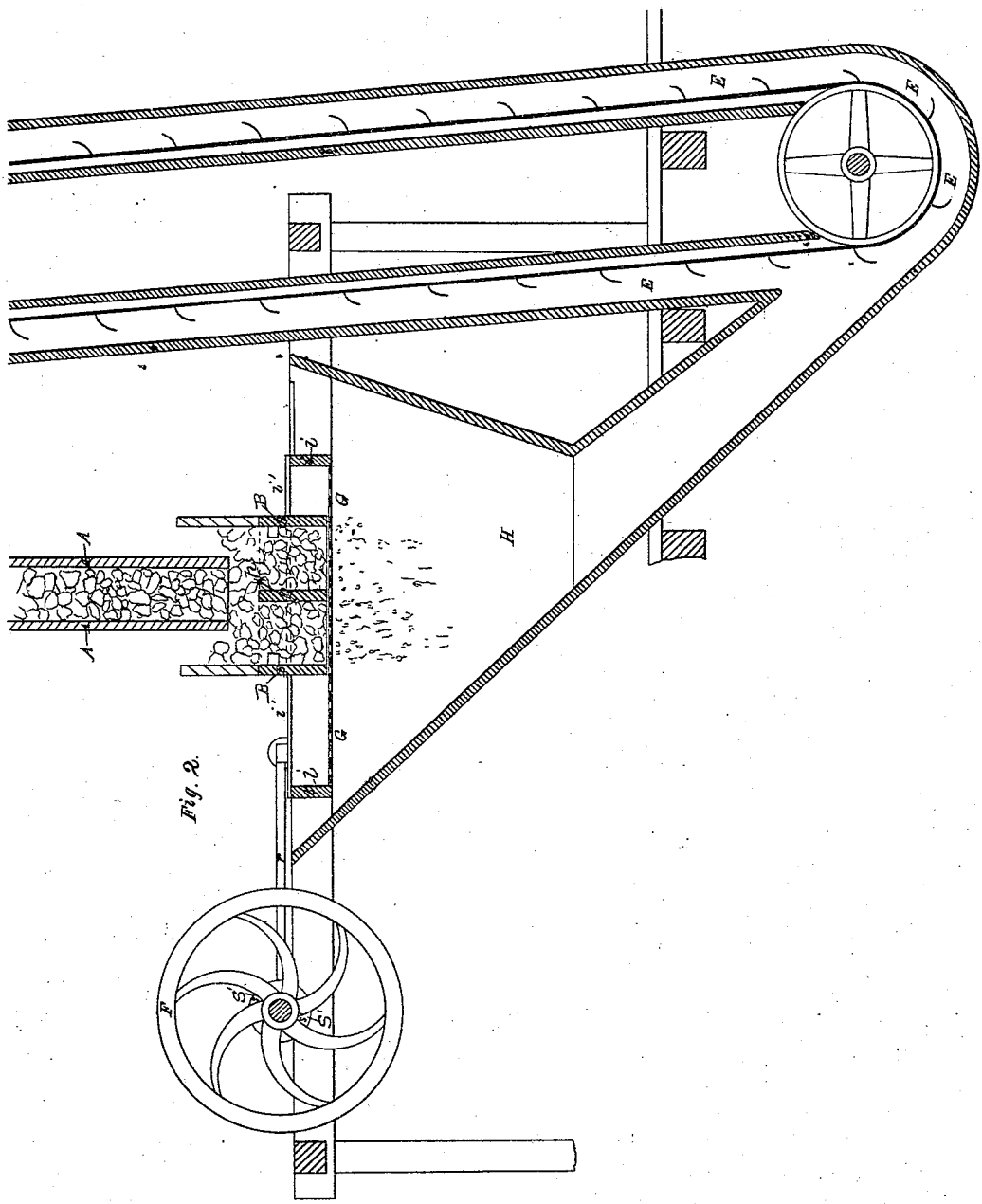

GEORGE F. WILSON, OF EAST PROVIDENCE, RHODE ISLAND.

Letters Patent No. 75,334, dated March 10, 1868.

IMPROVEMENT IN GRANULATING ACID PHOSPHATES.

*The Schedule referred to in these Letters Patent and making part of the same.*

TO ALL WHOM IT MAY CONCERN:

Be it known that I, GEORGE F. WILSON, of East Providence, in the county of Providence, and State of Rhode Island, have invented a new and improved Mode of Granulating Acid Phosphate of Lime when mixed with farinaceous matter; and I do hereby declare the following to be a full and exact description thereof, reference being had to the accompanying drawings, and to the letters of reference marked thereon.

The object of my invention is to break into small pieces, not exceeding a certain maximum size, the lumps of acid phosphate of lime, when mixed with farinaceous matter, as produced under Horsford's patents, and when the lumps have hardened to proper condition for granulation by spontaneous setting and drying, as described under Wilson's and Horsford's applications for patents, of even date herewith.

My invention consists essentially of a horizontal wire grating of uniform meshes, caused, by reciprocal motion, to slide backward and forward near, but not in contact with, the under surfaces of the sides of a vertical tube or spout or chute, which is kept filled with lumps of acid to be granulated, and constantly under the pressure of a column of lumps filling the chute above, though the chute itself is supported independently, and does not at all rest or press upon the wire grater. The friction and pressure unite to reduce the lumps to the fineness requisite to their passing through the meshes of the wire grating. The relations of the parts are exhibited in the accompanying diagrams.

Figure 1 is a top view of the apparatus, and

Figure 2 a sectional view, showing the relations of the working parts.

A A, figs. 1 and 2, is the tube or chute through which the coarse lumps are supplied from above. B B is the square frame, open at top and bottom, and is divided by one or more partitions, supported on the frame in such manner that the sieve or grater G G may move under, but without coming into contact with it. The oscillating-grate G G, underneath the bottom of the box B B, receives a reciprocating motion through the cross-bar O O, and the rods r r, from the crank S' S', set in action by the pulley T, which motion is regulated by the fly-wheel F, and stopped by slipping the belt to the loose pulley T'. H is a hopper underneath the sieve, for conveying the product of granulation, by a trough or otherwise, to the elevator E E.

The practical operation of the machine is as follows: Reciprocal motion having been communicated to the grater or sieve G, the chute A A and box B B are filled. The square box B B being filled, and nearly but not quite in contact with the wire grater, as previously described, the lumps, under the pressure of the constantly filled column of lumps in the chute A A, are rasped by the movement of the grater alternately from right to left. As the lumps are abraded, the granulated acid drops through the grate G G into the hopper H, and slides to the bottom, to be carried up by the elevator E E.

I have found it convenient to have the openings in the meshes of the sieve or grater about a quarter of an inch square, in which they are adapted in their size to the space between the slats in the drying-frames, described in my application for a patent drier, of even date herewith. It is convenient that the lumps of granulated acid should not be reduced to powder, but only to coarse grains, that will permit its being handled without annoyance to the men, and yet present considerable surface to the drying action of heated air.

What I claim, and desire to secure by Letters Patent of the United States, is—

1. The process of dividing the lumps of mixed acid phosphate of lime and farinaceous matter into small lumps, substantially as and for the purpose specified.

2. The combination of the feeding-spout and vibrating sieve or grater, constructed and operated substantially as above described, and for the purpose above set forth.

GEO. F. WILSON.

Witnesses:
 WILLIAM HEDGE,
 W. H. McGRENERY.